Nov. 15, 1938.  C. S. BRYKCZYNSKI ET AL  2,136,487

BREAD LOAF FORMING MACHINE

Filed Aug. 14, 1935  4 Sheets-Sheet 1

INVENTORS
Charles S. Brykczynski
and John Kosman
BY
ATTORNEY

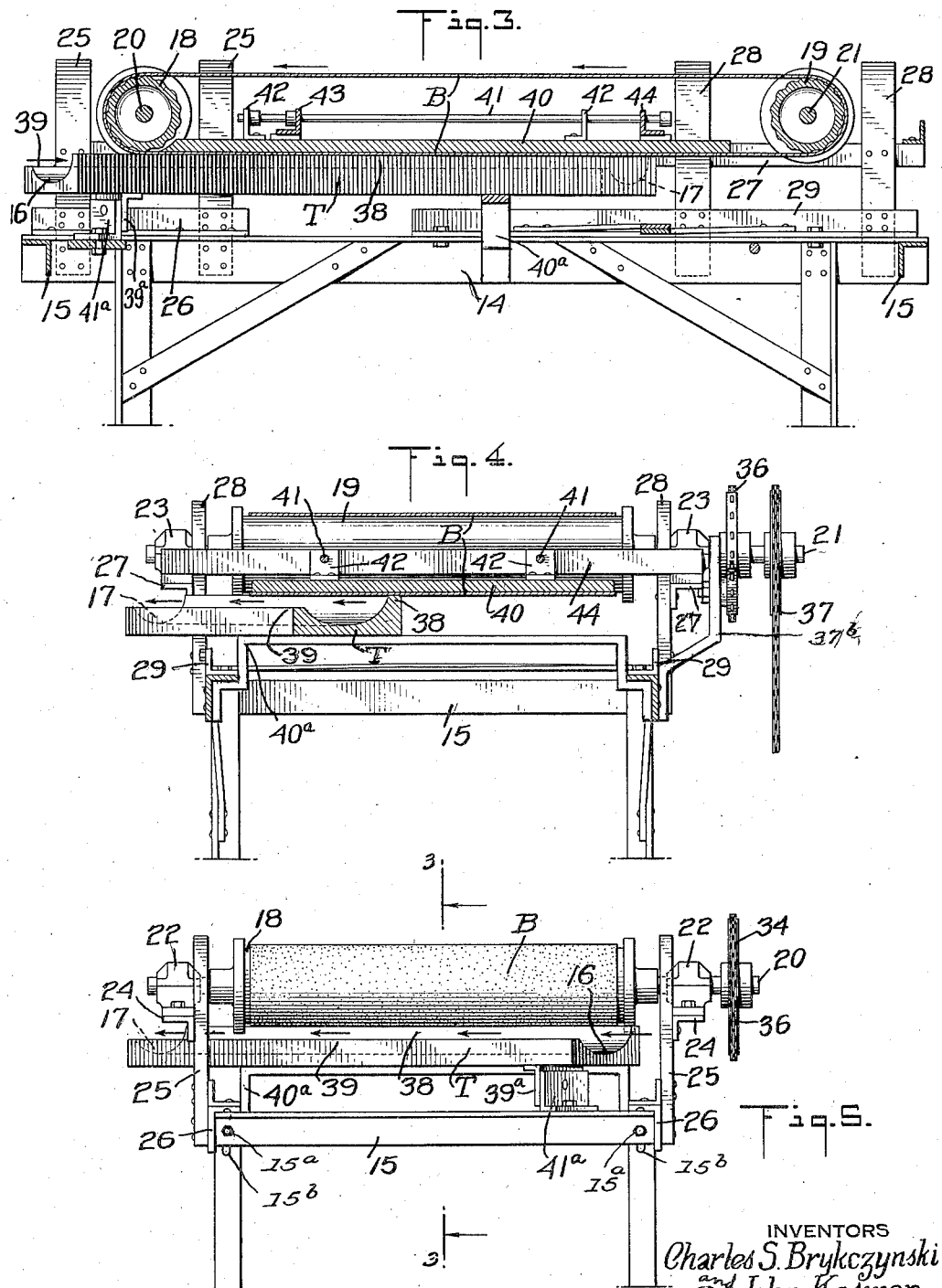

Nov. 15, 1938.     C. S. BRYKCZYNSKI ET AL     2,136,487
BREAD LOAF FORMING MACHINE
Filed Aug. 14, 1935     4 Sheets-Sheet 3
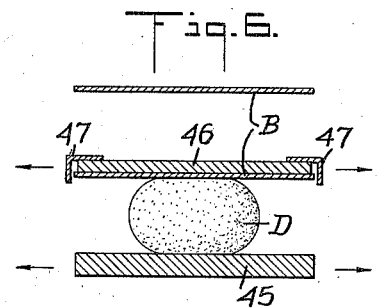
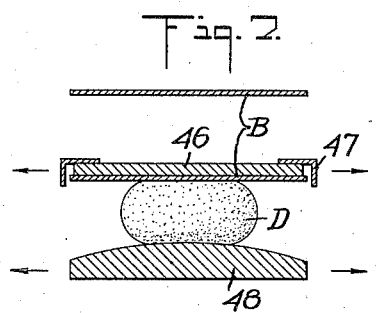
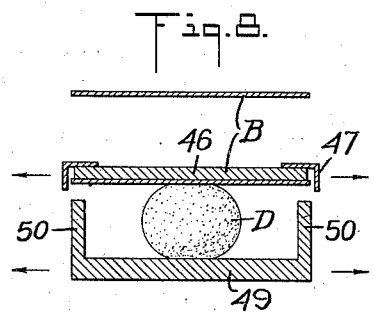
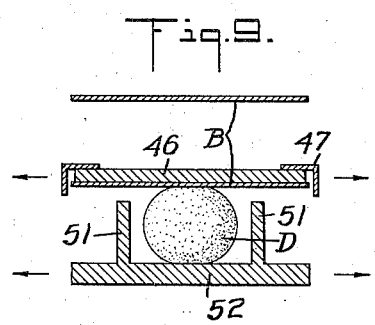
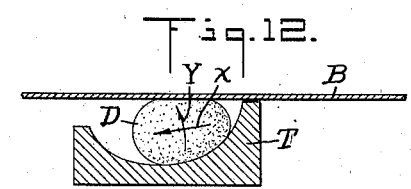
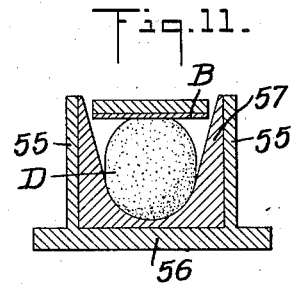
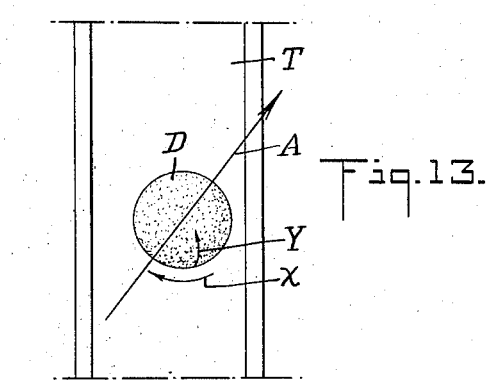
INVENTORS
Charles S. Brykczynski
and John Kosman
BY *N.H.Byrne* ATTORNEY Nov. 15, 1938.   C. S. BRYKCZYNSKI ET AL   2,136,487
BREAD LOAF FORMING MACHINE
Filed Aug. 14, 1935    4 Sheets-Sheet 4
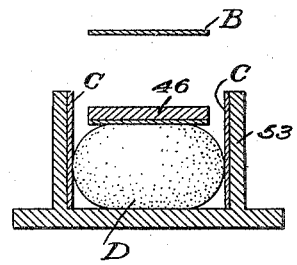
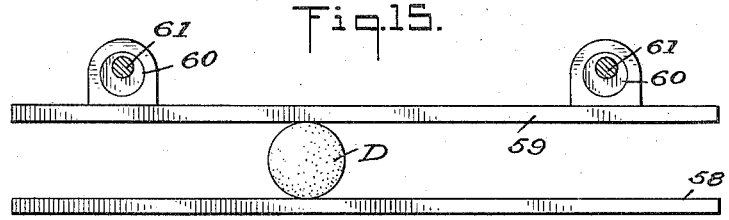
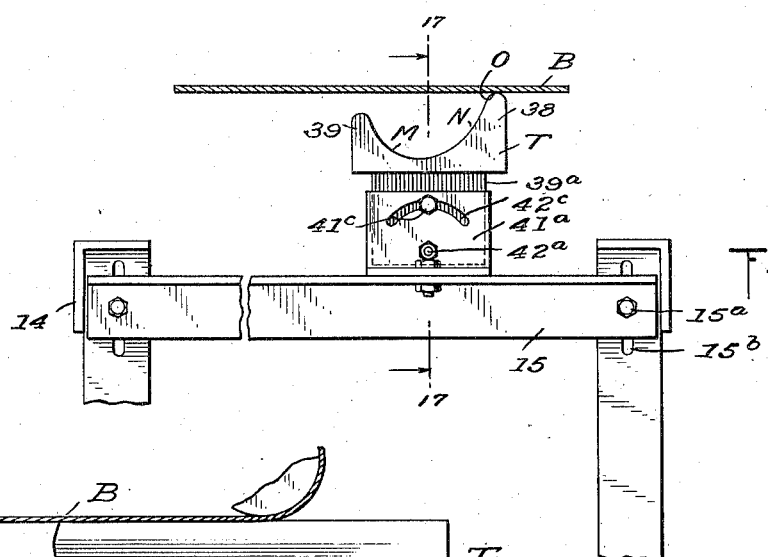
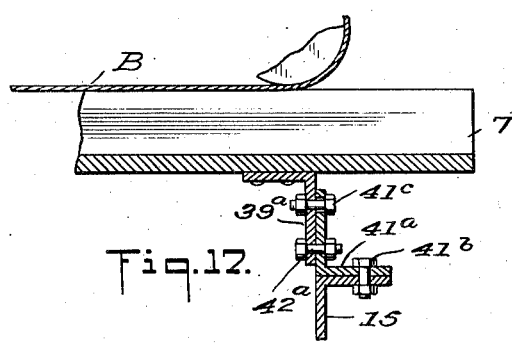
INVENTORS
Charles S. Brykczynski
and John Kosmar.
BY
ATTORNEY Patented Nov. 15, 1938

2,136,487

UNITED STATES PATENT OFFICE 2,136,487

BREAD LOAF FORMING MACHINE

Charles S. Brykczynski and John Kosman, Brooklyn, N. Y., assignors to Geo. F. Stuhmer & Company, New York, N. Y., a corporation of New York Application August 14, 1935, Serial No. 36,221

5 Claims. (Cl. 107—9)

The present invention relates to bakery equipment or bread making machinery and consists in the combinations and arrangements of elements hereinafter described and particularly set forth in the accompanying claims.

The purpose of the invention is to provide a bread shaping, balling or rounding machine wherein pieces of dough from a dough dividing machine, or other source, may be subjected to the requisite kneading or working while being conveyed or transferred preparatory to ultimate delivery to the baking oven, thereby avoiding the necessity for employing the usual dough rounder with the consequent saving of expense for such machinery and the cost incident to the upkeep or maintenance thereof, and in which the resultant product is superior to the present standard.

The essential purpose of the invention is to provide an apparatus for working on the pieces of dough which will give thereto just that requisite amount of forming or shaping action which will least disturb its normal vitality or life and thereby best condition the same for the baking oven.

A further purpose of the invention is to provide a bread working or kneading machine and a conveyer apparatus in one unitary and single mechanism wherein both the dough working and conveying functions are carried on simultaneously and in one continuous and unbroken operation without handling of the material, and in which the loaves or pieces of dough are worked upon with just that degree or extent required for proper baking.

The invention disclosed herein is proposed as an improvement or modification over the type of bread-loaf kneading and forming machine shown in our co-pending application for U. S. Patent, Serial No. 743,755, filed September 12, 1924, and is characterized in that it embodies a trough or channel-way through which the pieces of dough are rolled while being simultaneously kneaded or subjected to pressure by a belt moving in a direction divergent to the travel of the dough balls which forms the dough into shaped loaves ready for further processing, if any, before delivery to the baking oven. Means are provided for accurately adjusting the working space between the trough and the belt to regulate the degree of pressure to which the dough balls are subjected in accordance with the character of material in hand and the product to be baked. Also the trough is adapted for setting at varying degrees of angularity commensurate with the particular dough or material being worked upon.

The invention is shown by way of illustration in the accompanying drawings, wherein:

Figure 1 is a side elevation view of the machine complete.

Figure 2, a top plan view partly broken away for clearness.

Figure 3, a vertical longitudinal sectional view taken on the line 3—3 of Figure 5.

Figure 4, a vertical transverse section on the line 4—4 of Figure 1.

Figure 5, an elevation at the delivery end of the machine.

Figures 6 to 11, inclusive, show modified forms of tables, troughs, and belts that may be employed, and Figures 12 and 13 are detailed views of the preferred form of trough as used in Figures 1 to 5 above.

Figure 14 shows a further modified form of trough and dough working belt.

Figure 15 illustrates a type or construction of apparatus for shaping the dough pieces into loaves without the use of belts.

Figure 1:
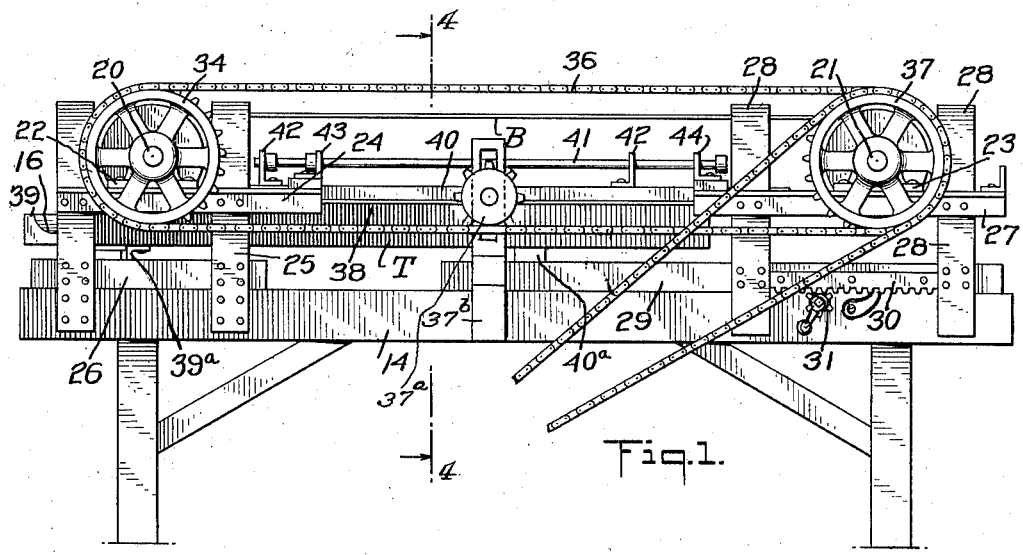

Figure 16 an end elevational view of the dough shaping trough and adjusting means, with which the machine is equipped, as shown in Figures 1 to 5 above, and;

Figure 17 a transverse sectional view taken on the line 17—17 of Figure 16.

Referring to the construction in further detail and with like reference characters designating corresponding parts in the different figures shown, the apparatus or machine comprises essentially a supporting structure or rectangular framework, 14—15, on which is mounted to travel an endless belt B that cooperates with an open trough T disposed diagonally of the belt, to knead or work upon pieces of dough D and simultaneously convey the same for a time interval sufficient to shape and otherwise condition the same into formed loaves, whence they are discharged for further treatment before delivery to the baking oven. The dough pieces D are fed into the machine at point 16 and discharged at 17.

Figure 2:
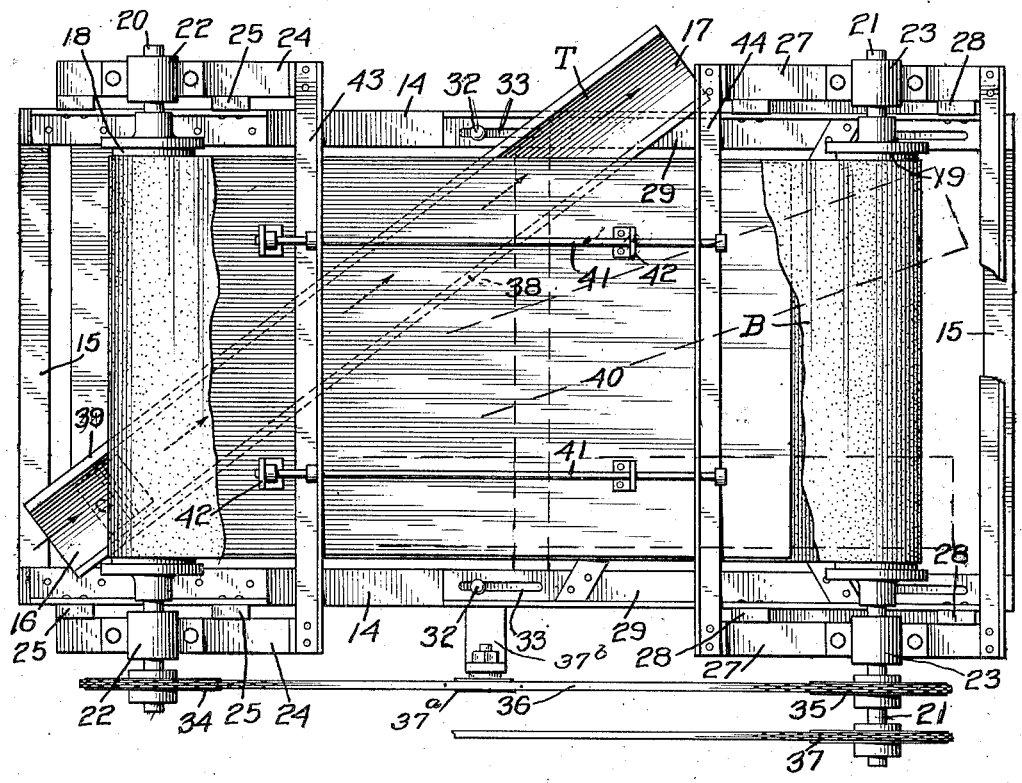

The conveyer and kneading belt B is mounted on a pair of corrugated or fluted pulleys 18 and 19 whose shafts 20 and 21 are suitably journalled in bearings 22 and 23 mounted respectively on a fixed and an adjustable support in the frame structure 14—15. The bearings 22 for pulley 18 are set on angle-bars 24 carried by uprights 25 at each side of the machine (Figure 1) and for each pair of uprights there is an angle piece 26 securing the pulley support to the frame. The adjustable pulley 19 has its shaft journals 23 similarly mounted on angle-bars 27 supported by uprights 28 that are secured to horizontal bars 29 that have limited sliding movement on the supporting structure, as indicated in Figures 2 and 3. An ordinary rack and pinion device 30—31 is provided for moving the adjustable pulley support, and a bolt and slot engagement 32 and 33 serves for securing same in set position. (See Figure 1.)

The two pulleys 18 and 19 are connected to be driven at uniform speed by sprockets 34 and 35 carrying a chain 36, and the driving shaft 21 of pulley 19 is connected to be driven from a suitable power source or prime mover (not shown) by the chain and sprocket element 37. A sprocket 37a adjustably mounted on the slotted bracket arm 37b engages with chain 36 and keeps the same at proper tension.

The trough T is located immediately beneath the lower working length or stretch of belt B and is disposed diagonally thereof after the manner illustrated in Figure 2, to the end that the pieces of dough will be subjected to a combined rolling and pressure action as they travel from the point of insertion to the place of discharge. Said trough is constructed of any suitable material and is appreciably shallow, as distinct from being deep, whereby to subject the maximum surface of the dough pieces to impinging contact with the belt, and one side 38 of the trough is raised or appreciably higher than the other 39 (Figure 4) and has contacting engagement with the dough engaging surface of the belt. With the pieces of dough being thus worked upon by the divergent forces indicated by arrows X and Y (Figures 12 and 13) and simultaneously caused to travel for the full length of the trough, the dough balls or kneaded loaves are held at all times within the channel of the trough proper and are kept free from possible mutilation as would otherwise likely occur if there was any appreciable distance or space between the trough edge and the belt, as will be understood.

The belt B is held in intimate contact with the shaping loaves D by an abutting surface element or plate 40 which covers substantially the entire working length or stretch of the belt, as clearly shown in Figures 2, 3 and 4; and the supporting means for said abutting plate 40 consists of two horizontal rods 41 having angular pieces or brackets 42 to which the plate 40 is fastened. The bars 41 are in turn slidably fitted on supports 43 and 44 disposed transversely of the machine, and said supports 43 and 44 are mounted on pulley framework supports 24 and 27, as shown in Figures 1 and 2. The bars 41 with brackets 42 permit adjustment of the movable pulley 19, as will be understood.

The trough T is adapted for lateral-wise and tilting or angular adjustment for setting to a nicety its position for working with the belt B commensurate with the particular dough or other material being worked upon. The means therefor consists of angle pieces 39a and 41a pivotally connected by the bolt 42a (Figures 16 and 17) and angle piece 41a is swivelly mounted on the cross bar 15 of the frame by pin 41b. By these devices the trough T may be adjusted or set to any desired lateral-wise position on its pivot 41b as indicated by the dotted lines in Figure 2 and accordingly the length-wise adjustment (32—33) of the frame is regulated. Thus in the different positions indicated the discharge or free end of the trough T may be set to discharge its contents between the mountings of pulley 19, as well as between pulleys 18 and 19 as shown. The desired angular position or tilting of the trough is obtained by the pivot bolt 42a and securing bolt 41c fitting in an arcuate slot 42c of angle member 41a (Figures 16 and 17) and supporting cross bar 15 has limited vertical adjustment through bolt and slot engagements 15a and 15b in the frame supports as shown. By these connections the relationship of the trough T and belt B may be varied, and in such adjustments the motion of the free end of the trough takes place substantially between points M and N, some distance away from belt B, and the point of contact O between the trough and belt remains constant or stationary. To facilitate this the belt contacting portion of the trough has been rounded off or sharply curved as clearly shown in Figure 16. Thus with this arrangement the free or open side of the trough may be brought closer to, or further from the belt thereby increasing or decreasing at will the pressure exerted upon the dough pieces during their travel through the trough.

In operation the dough balls or pieces D are rolled along the trough T in a path divergent to the direction of movement of the belt, as indicated by arrow A (Figure 13), and in course of which pressure is applied to the forming loaf, as indicated by arrows X and Y, with the effect that the resultant force imparted gives to the dough piece or ball substantially that shape illustrated in Figure 12, when it is discharged ready for further treatment before delivery to the oven.

In the modified constructions shown in Figures 6 to 14 the features characteristic thereof are; in Figure 6, the dough operating element 45 comprises a solid and plane surface or board adapted to be moved lateral-wise, as shown by the arrows, and which co-operates with an endless belt B likewise mounted to move from side to side, but in oppositely timed relation to the base piece 45. A belt contacting and pressure plate 46 immediately overlies the working length of the belt, and suitable retaining member 47 is provided for holding the belt B and pressure element 46 against relative displacement.

In Figure 7 the parts are essentially the same as in Figure 6, except that in this instance the base piece 46 has a curved dough kneading surface as shown, and in Figure 8 the base portion 49 is formed with side portions 50 extending the entire length of the trough. In Figure 9 the parts are essentially the same as in Figure 8, excepting that the side portions 51 of the base piece 52 are located appreciably within the side edges of said base piece whereby to function as limiting or retaining elements for the worked dough ball. In Figure 10 the parts are in the main the same as those in Figure 9, excepting that the retaining side members 53 are appreciably higher than in Figure 9, and in this instance the base portion 54 is adapted to be stationary as distinct from having any lateralwise movement, and the belt B operates within the two side members 53. In Figure 11 the side pieces 55 are slightly higher from the base portion 56 than the sides in Figure 10, and the trough is provided with a shaped channel member 57 somewhat deeper than the trough T of the preferred form as best illustrated in Figs. 3, 4, 5, 12 and 16.

In the construction shown in Figure 14 the belt

B is supplemented by two side belts C that have intimate contact with the backing uprights 53 of the trough after the manner of the backing or abutment 46 for the primary belt B. Said supplemental belts C are operated in a direction reverse or opposite to that of travel of belt B and the function thereof is to increase the action normally present by the stationary or backing elements 53. In other respects the trough and its cooperating belts function the same as described in the several constructions above.

In the arrangement shown in Figure 15 the dough supporting element 58 co-acts with a reciprocable and pressure element 59 mounted on eccentrics 60 of shafts 61 and adapted to have intermittently forward and pressure action against the dough piece D on each rotation of the shafts 61. Thus through the function of the two eccentrics 60 the pressure or dough working element 59 is caused to move forwardly, upwardly, backwardly, thence again forwardly, and this operation or working cycle continues upon the dough piece D giving thereto the desired manipulation and form.

In lieu of having the diagonal trough located beneath the belt the invention also contemplates a reverse arrangement, i. e., the placement of any of the troughs above or on top of the belt. In like manner any of the arrangements in Figures 6 to 14 herein described may have their dough working elements in transposed relation to that in which they are shown. Also, it will be further understood the invention as herein disclosed is not limited to the details of construction shown and described, and that these may be varied widely without departing from the spirit of the invention as defined by the claims.

What is claimed as new is:

1. In a bread-loaf kneading and forming machine and conveyer, the combination of an endless belt, a dough working and loaf shaping trough disposed diagonally of the belt and co-operable therewith, means for adjusting the lateral angular position of the trough with respect to the belt, and means for tilting the trough on its axial longitudinal axis to vary its angular relation with the belt, substantially as set forth.

2. In a bread-loaf kneading and forming machine and conveyer, the combination of an endless belt, a dough working and loaf shaping trough extending adjacent to one stretch of the belt and co-operable therewith, and means for tilting the trough on its longitudinal axis to vary its axial angular relation with the belt.

3. In a bread-loaf kneading and forming machine and conveyer, the combination of a supporting structure, belt pulleys journaled thereon, an endless belt on said pulleys, a trough extending diagonally of said belt, an abutting surface extending over one stretch of the belt and disposed in intimate contact therewith to apply pressure through said belt against the dough pieces as they pass along the trough, means for continuously moving said belt to effect lengthwise travel of the dough pieces through said trough and thereby apply pressure laterally as well as forwardly in kneading the dough during its passage through the trough, and means for tilting the trough on its longitudinal axis to vary its axial angular relation with the belt.

4. In a bread-loaf kneading and forming machine and conveyer, the combination of a supporting structure, belt pulleys journaled thereon, an endless belt on said pulleys, a trough extending diagonally of said belt and having one side edge thereof contacting with the belt, an abutting surface extending over one stretch of the belt and disposed in intimate contact therewith to apply pressure through said belt against the dough pieces as they pass along the trough, means for continuously moving said belt to effect lengthwise travel of the dough pieces through said trough and thereby apply pressure laterally as well as forwardly in kneading the dough during its passage through the trough, means for adjusting the trough lateral-wise, and means for tilting the trough on its longitudinal axis to vary its axial angular relation with the belt.

5. In a bread-loaf kneading and forming machine and conveyer, the combination of a supporting structure, belt pulleys journaled thereon, an endless belt on said pulleys, a straight trough extending diagonally of said belt and contacting directly therewith along one side edge, an abutting surface extending over one stretch of the belt and disposed in intimate contact therewith holding said belt against the side edge of the trough, and applying pressure through said belt against the dough pieces as they pass along the trough; means for continuously moving said belt to effect lengthwise travel of the dough pieces through said trough and thereby apply pressure laterally as well as forwardly in kneading the dough during its passage through the trough, and means for adjusting the trough lateralwise of the belt.

CHARLES S. BRYKCZYNSKI.
JOHN KOSMAN.